United States Patent [19]

Lane et al.

[11] Patent Number: 4,551,358

[45] Date of Patent: Nov. 5, 1985

[54] ELECTRODE PREPARATION

[75] Inventors: Edward S. Lane, Didcot; Michael R. H. Hill, Wantage, both of England

[73] Assignee: United Kingdom Atomic Energy Authority, England

[21] Appl. No.: 619,323

[22] Filed: Jun. 11, 1984

Related U.S. Application Data

[63] Continuation of Ser. No. 450,130, Dec. 15, 1982, abandoned.

[30] Foreign Application Priority Data

Dec. 18, 1981 [GB] United Kingdom ............... 8138252

[51] Int. Cl.$^4$ ............................................. H01M 4/28
[52] U.S. Cl. ................................. 427/126.6; 427/246; 427/247; 427/343; 427/435; 429/223
[58] Field of Search ................... 427/126.6, 246, 247, 427/343, 435; 429/223; 204/2.1

[56] References Cited

U.S. PATENT DOCUMENTS

| | | | |
|---|---|---|---|
| 3,214,355 | 10/1965 | Kandler | 429/235 |
| 3,248,266 | 4/1966 | Rampel | 204/2.1 |
| 3,458,306 | 7/1969 | Lindquist | 75/0.5 AC |
| 4,160,047 | 7/1979 | Saridakis | 427/126.6 |

Primary Examiner—Richard Bueker
Attorney, Agent, or Firm—Larson and Taylor

[57] ABSTRACT

A nickel oxide electrode is made by impregnating a porous nickel substrate with a dispersion of a nickel compound, converting the compound in situ to nickel hydroxide, and removing reaction products.

In order to overcome corrosion problems, facilitate removal of by-products and improve electrode performance, the dispersion is provided in a non-aqueous medium (e.g. as a methanolic solution of $NiCl_2.6H_2O$) such that the in situ conversion gives rise to the nickel hydroxide in the form of a gel and to easily removable (e.g. volatile) reaction products. Such a conversion may be carried out by contacting the methanolic solution with an epoxy compound such as propylene oxide.

4 Claims, No Drawings

ELECTRODE PREPARATION

This is a continuation of application Ser. No. 450,130 filed Dec. 15, 1982, now abandoned.

This invention relates to a nickel oxide electrode comprising a porous nickel substrate impregnated with nickel hydroxide and to a method of making such an electrode by impregnating a porous nickel substrate for an electrode with a dispersion of a nickel compound in a liquid medium, converting the compound in situ to nickel hydroxide and removing reaction products.

Nickel oxide electrodes can be made, for example by a multi-stage process which includes a chemical impregnation step. Thus, in a specific example, a sintered nickel plaque is vacuum impregnated with an aqueous solution of a nickel salt and the salt is then converted to nickel hydroxide by immersing the impregnated plaque in an aqueous hydroxide solution (e.g. KOH). The above process which is described by S. U. Falk and A. J. Salkind in "Alkaline Storage Batteries", published by John Wiley (1969), may have to be repeated several times in order to achieve a desired loading of nickel hydroxide in the plaque.

There are, however, problems associated with the above process. Firstly, undesirable by-products may be generated by the chemical reaction in which the nickel hydroxide is formed. The precise by-products formed will depend upon the particular nickel salt used and the particular hydroxide used. They may, for example, be KCl or $KNO_3$ and would have to be removed by washing. Secondly, the use of an aqueous solution can lead to corrosion of the sintered plaque thereby giving rise to blistering and/or swelling during use of the final electrode in an electrochemical cell. The above problems constitute the major reasons for the development and use of electrochemical impregnation methods for making nickel electrodes, particularly where high quality nickel electrodes are required. Such an electrochemical impregnation method is described in U.S. Pat. No. 3,214,355 (Kandler).

The invention as claimed remedies the corrosion problem by using a non-aqueous dispersion and can be carried out in such a way as to facilitate removal of by-products. Moreover, the nickel hydroxide is produced in the form of a gel in the porous substrate; this may give rise to improvements in the performance of the final electrode.

Thus, in one aspect the present invention provides a method of making a nickel electrode which comprises
(i) impregnating a porous nickel substrate for an electrode with a dispersion of a nickel compound in a liquid medium;
(ii) converting the compound in situ to nickel hydroxide; and
(iii) removing reaction product(s) to provide the final electrode,
characterised in that the nickel compound is convertible to nickel hydroxide gel in step (ii) and the liquid medium is non-aqueous.

The use of a non-aqueous liquid medium enables the above-mentioned corrosion problem to be limited, for example by choice of a suitable non-aqueous medium such as methanol. The dispersion may, for example be a true solution or it may be a colloidal dispersion, i.e. a sol. It is preferred that the dispersion is a solution since it is known from U.S. Pat. No. 3,458,306 that methanolic solutions of nickel salts can readily be converted to gels. Also, the by-products of such conversion are volatile, as will be described below, and are therefore readily removable from the substrate.

Step (i) may be carried out by methods known in the art for impregnating porous substrates with liquids such as vacuum impregnation or simple dipping of the substrate into the dispersion followed by removal. The porous nickel substrate used may be a porous sintered nickel plaque such as used in the art in the preparation of a nickel oxide electrode.

The final electrode may, if required, be provided with additional constituents for facilitating performance. An example of such an additional constituent is cobalt hydroxide which may be provided by impregnating the substrate with a dispersion of a cobalt compound in a non-aqueous medium, said cobalt compound being convertible to cobalt hydroxide gel, converting the compound in situ to cobalt hydroxide gel and removing reaction products. The provision of cobalt hydroxide may be carried out by including the cobalt compound in dispersion in the same liquid medium as the nickel compound. Alternatively, the provision of the cobalt hydroxide may be carried out as a separate combination of the above steps after provision of the nickel hydroxide in the substrate.

Where a solution of a nickel compound is used in step (i), step (ii) may be carried out by contacting the impregnated substrate with an epoxy compound. Examples of epoxy compounds suitable for this purpose are lower alkylene oxides such as ethylene oxide, propylene oxide, or butylene oxide; glycidal; and epichlorohydrin. Use of epoxy compounds to effect the conversion of a nickel compound to nickel hydroxide gel is described in the abovementioned U.S. Pat. No. 3,458,306. The reaction may possibly be as follows in the case where the nickel compound is $NiCl_2.6H_2O$ and the epoxy compound is ethylene oxide:

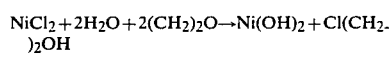

It will be seen that the by-product of this reaction is ethylene chlorhydrin which is a volatile compound and therefore readily removable. If a Co compound is present, it will similarly be converted to $Co(OH)_2$. Contact of the impregnated substrate with the epoxy compound may be carried out, for example by using the epoxy compound in liquid or in vapour form.

Step (iii) may be carried out, for example by gentle heating e.g. up to 60° C. and/or evacuation depending upon the nature and properties of the by-products desired to be removed.

The method of the invention may be repeated a number of times as necessary to achieve a desired concentration of nickel hydroxide per unit void volume in the substrate. This concentration is usually referred to in the art as a "loading". The number of times the method of the invention has to be repeated to achieve a desired "loading" may be reduced by using a dispersion of as high a concentration as possible in step (i).

In a further aspect, the invention provides a nickel oxide electrode comprising a porous nickel substrate impregnated with nickel hydroxide, characterised in that the nickel hydroxide is in the form of a gel thereof. The crystallite size in the gel is small which could be a valuable property for enhancing the performance of the final electrode.

As indicated above in connection with the method of the invention, the nickel hydroxide gel may be associated with cobalt hydroxide gel in the final electrode for improving the performance thereof. The cobalt hydroxide may, for example, constitute from 2.5% to 15% by weight of the weight of the nickel hydroxide.

A nickel oxide electrode of the invention may be used in an electrochemical cell as described in the art. If the final electrode is intended for use in a nickel/$H_2$ cell, the substrate may carry as little as 1.3 g of nickel hydroxide per cc of its void volume. For use in other cells such as Ni/Zn cells, the substrate may carry as much as 1.8 g of nickel hydroxide per cc of its void volume.

The term "nickel oxide electrode" is used in the art to describe a porous nickel substrate impregnated with nickel hydroxide is similarly used herein. In use in an electrochemical cell, the nickel hydroxide is charged towards nickel oxyhydroxide (NiO.OH).

The invention will now be particularly described, by way of example only, as follows.

EXAMPLE 1

A solution was prepared by dissolving $NiCl_2.6H_2O$ (95 g) and $CoCl_2.6H_2O$ (5 g) in methanol (175 ml). A porous nickel battery plaque was immersed in the solution, removed and allowed to drain and then supported in a closed container. Propylene oxide was introduced into the container and allowed to react with the solution for 48 hours. The plaque was removed from the container and heated in a vacuum oven at 50° C. to remove volatile by-products. The product consisted of the plaque impregnated with nickel hydroxide gel. The "loading" of nickel hydroxide in the plaque was measured. The process was repeated a number of times (e.g. 8) to achieve a desired "loading".

EXAMPLE 2

A solution was prepared by dissolving $NiCl_2.6H_2O$ (20.0 g) and $CoCl_2.6H_2O$ (2 g) in a mixture of methanol (20 ml) and water (5 ml). A porous nickel battery plaque (weight 9.37 g) was immersed in the solution in a dish and the solution heated to 80° C. with the plaque immersed therein. The resulting immersed plaque was placed in a dessicator which was then evacuated to promote penetration of the solution into the pores of the plaque. The plaque was removed from the solution and the dessicator, placed in a shallow dish and covered with a layer of propylene oxide. The shallow dish was closed by means of a sealed lid and allowed to stand at room temperature for 12 hours. Residual propylene oxide was removed and the plaque washed with methanol and heated in an oven at 100° C. to remove volatile by-products. The impregnated plaque weighed 10.76 g.

The above procedure was repeated following which the impregnated plaque weighed 12.37 g. A further repetition of the above procedure gave rise to an impregnated plaque weighing 13.23 g.

We claim:

1. A method of making a nickel oxide electrode which comprises
   (i) impregnating a porous nickel substrate for an electrode with a solution of a nickel compound in a non-aqueous liquid medium, said nickel compound being convertible to nickel hydroxide gel in step (ii);
   (ii) contacting the impregnated substrate with an epoxy compound thereby to convert the nickel compound in situ to nickel hydroxide gel; and
   (iii) removing reaction product(s) to provide the final electrode.

2. A method as claimed in claim 1 wherein the non-aqueous liquid is methanol.

3. A method as claimed in claim 1 wherein the epoxy compound is a lower alkylene oxide.

4. A method as claimed in claim 1 wherein the final electrode is additionally provided with cobalt hydroxide by impregnating the substrate with a solution of a cobalt compound in a non-aqueous liquid medium, said cobalt compound being convertible to cobalt hydroxide gel; contacting the impregnated substrate with an epoxy compound thereby to convert the cobalt compound in situ to cobalt hydroxide gel; and removing reaction product(s).

* * * * *